(No Model.)
J. B. CLYNE.
STOPPING AND REVERSING MECHANISM.
No. 497,865. Patented May 23, 1893.
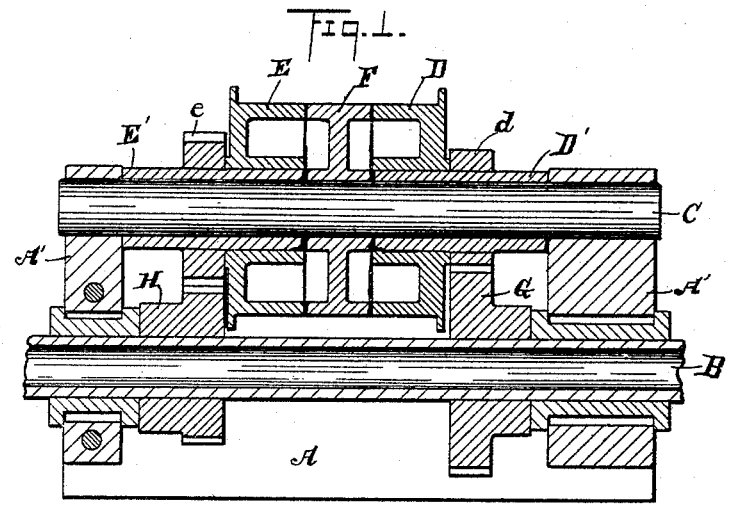
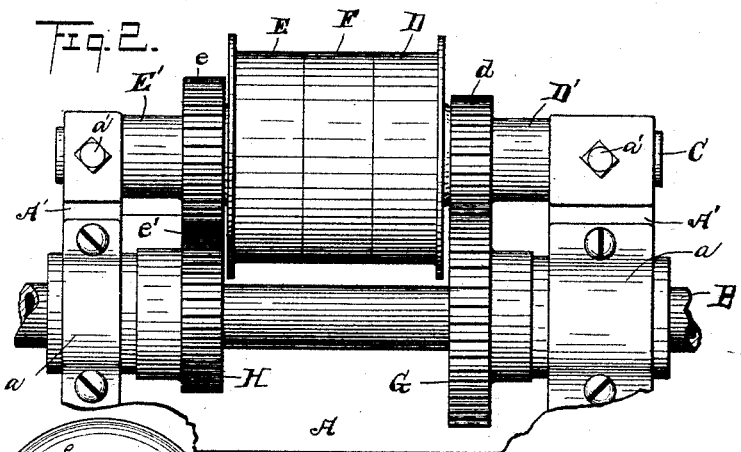
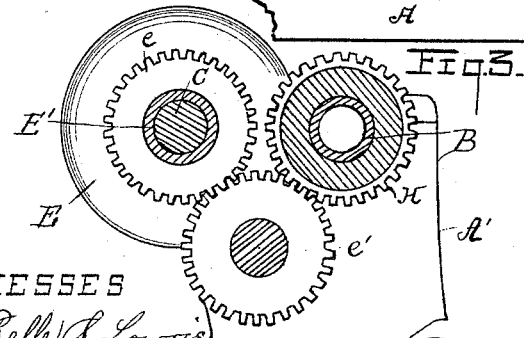
WITNESSES
Belle S. Lowrie
A. S. Lowrie
INVENTOR
James B. Clyne.
By Geo. W. King
ATTORNEY.

UNITED STATES PATENT OFFICE.

JAMES B. CLYNE, OF CLEVELAND, OHIO.

STOPPING AND REVERSING MECHANISM.

SPECIFICATION forming part of Letters Patent No. 497,865, dated May 23, 1893.

Application filed February 23, 1893. Serial No. 463,341. (No model.)

*To all whom it may concern:*

Be it known that I, JAMES B. CLYNE, of Cleveland, in the county of Cuyahoga and State of Ohio, have invented certain new and useful Improvements in Stopping and Reversing Mechanism; and I do hereby declare the following to be a full, clear, and exact description of the invention, such as will enable others skilled in the art to which it pertains to make and use the same.

My invention relates to improvements in stopping and reversing mechanism, and it consists in certain features of construction and in combination of parts hereinafter described and pointed out in the claim.

In the accompanying drawings Figure 1 is a horizontal central section, and Fig. 2 is a plan of mechanism embodying my invention. Fig. 3 is an end view, partly sectional.

A, represents what is supposed to be the "head" of a machine, for instance, the head of a machine for manufacturing screws, and A' A', are the upright end members of the head. Members A', are provided with boxes as at $a$, in which boxes is journaled the hollow mandrel B. Members A', are also bored horizontally to receive the stationary bar C, this bar being engaged by set-screws $a'$, that hold the bar from turning on its axis. On the stationary bar C are mounted the idle pulley F, and sleeves D' E', and rigidly mounted on these sleeves, respectively, is a pulley D and E, the idle pulley F being located between pulleys D and E, and the three pulleys being of equal diameter. On sleeve D' is rigidly mounted a pinion $d$, this pinion engaging a spur-gear G, the latter being rigidly mounted on mandrel B. On sleeve E' is rigidly mounted pinion $e$, this pinion engaging an intermediate pinion $e'$, and the latter in turn engaging gear H, the latter being rigidly mounted on mandrel B. A pulley and its co-operating pinion are secured to the sleeve on which they are mounted, preferably by a driving fit. For instance pulley D, and pinion $d$, are thus secured to sleeve D', and in like manner pulley E, and pinion $e$, are secured to sleeve E', by means of a driving fit, whereby the sleeve that sustains the wear can be replaced. With such construction it is evident that while the driving belt (not shown) remains on the idle pulley F, mandrel B will remain at rest, and that in shifting the driving belt from pulley D to pulley E, and vice versa, the mandrel will reverse. I find cast iron to be the best material that I am acquainted with for bar C. The sleeves D' E', I usually construct of steel, although bronze or other suitable anti-friction material would answer the purpose.

The device is snug and convenient, but should not be confounded with other somewhat similar devices where a revolving shaft takes the place of the stationary bar C. The construction last referred to would doubtless be practicable for many purposes, but would not answer my purpose at all.

I use my device on machines where high speed is required. Having obtained a speed as high as practicable by reason of the stationary member C, it is evident that I would have to reduce such speed about one half in case a revolving shaft were substituted for member C, for the reason that such shaft would revolve in the opposite direction from that of some one of the members mounted on the shaft, and the result would be that the opposing surfaces would "heat." Sometimes I construct sleeve D' integral with its pinion $d$ and sleeve E' integral with its pinion $e$. This construction is considered good practice where the sleeve and its pinion are likely to wear about alike.

What I claim is—

In combination, a mandrel and a stationary bar arranged parallel therewith, the mandrel bearing gears rigid therewith, the stationary bar having mounted thereon an idle pulley and sleeves arranged on each side of such idle pulley, each sleeve bearing a pulley and a pinion secured thereon, the one pinion engaging the opposing gear of the mandrel, and the other pinion engaging an intermediate pinion, the latter in turn engaging the other gear of the mandrel, substantially as and for the purpose set forth.

In testimony whereof I sign this specification, in the presence of two witnesses, this 13th day of February, 1893.

JAMES B. CLYNE.

Witnesses:
GARDNER P. NASH,
JNO. L. KUCHERA.